United States Patent [19]

Noguchi et al.

[11] 4,119,065
[45] Oct. 10, 1978

[54] INTERNAL COMBUSTION ENGINE HAVING AN AUXILIARY COMBUSTION CHAMBER AND A METHOD OF CONTROL OF COMBUSTION IN SAID INTERNAL COMBUSTION ENGINE

[75] Inventors: Masaaki Noguchi, Nagoya; Yukiyasu Tanaka, Okazaki; Katuhiko Motosugi, Toyota, all of Japan

[73] Assignee: Toyota Jidosha Kogyo Kabushiki Kaisha, Toyota, Japan

[21] Appl. No.: 743,708

[22] Filed: Nov. 22, 1976

[30] Foreign Application Priority Data

Dec. 26, 1975 [JP] Japan .................. 50-159017

[51] Int. Cl.$^2$ .................. F02B 19/10; F02B 19/16
[52] U.S. Cl. .................. 123/32 SP; 123/30 D
[58] Field of Search ............. 123/32 ST, 32 SP, 75 B, 123/30 D, 191 S, 191 SP

[56] References Cited

U.S. PATENT DOCUMENTS

4,076,000   2/1978   Goto et al. .................. 123/32 SP

Primary Examiner—Ronald B. Cox
Attorney, Agent, or Firm—Stevens, Davis, Miller & Mosher

[57] ABSTRACT

An internal combustion engine having an auxiliary combustion chamber connected to a main combustion chamber via multiple connecting holes is disclosed. The auxiliary combustion chamber has a drum shape. A first one of the connecting holes opens into the auxiliary combustion chamber in a direction tangential to the cylindrical circumferential wall of the drum shaped auxiliary combustion chamber for creating a swirl in the auxiliary combustion chamber at the compression stroke. An open end of the first hole on the main combustion chamber side is directed to the intake valve for scavenging the auxiliary combustion chamber at the intake stroke.

28 Claims, 13 Drawing Figures

INTERNAL COMBUSTION ENGINE HAVING AN AUXILIARY COMBUSTION CHAMBER AND A METHOD OF CONTROL OF COMBUSTION IN SAID INTERNAL COMBUSTION ENGINE

DESCRIPTION OF THE INVENTION

The present invention relates to an internal combustion engine in which an exhaust gas can be effectively purified, and particularly relates to an internal combustion engine in which a combustion chamber is divided into a main combustion chamber and an auxiliary combustion chamber and an air-fuel mixture is supplied into the auxiliary combustion chamber through the main combustion chamber.

Recently, exhaust gas from internal combustion engine of automobiles has been regarded as one cause of environmental pollution, and regulations regarding such exhaust gas have become increasingly strict year after year. As pollution countermeasures, there have heretofore been proposed various methods in which in order to reduce the contents of the poisonous components in an exhaust gas (so-called base emission), the combustion of the air-fuel mixture is improved. In an internal combustion engine of an automobile, the fuel consumption and drivability are important factors, and it is practically required to reduce the poisonous components of base emission without an increase of the fuel consumption or degradation of the drivability. One apparently promising method of reduction of the poisonous components of the base emission is by such expansion of the combustion limit of a lean air-fuel mixture as to enable the leaner air-fuel mixture to completely burn. It is generally said that if an air-fuel mixture having the air-fuel ratio of 19 to 1 to 20 to 1 is completely burnt in a combustion chamber, the contents of the three components of the base emission, i.e., hydrocarbons (HC), nitrogen oxides ($NO_x$) and carbon monoxide (CO), can be reduced. However, even if such a lean air-fuel mixture in a conventional engine is burnt even in a good condition, in general, the burn-out time is prolonged, the combustion energy cannot be utilized sufficiently as the work and therefore, the engine output is reduced and the drivability is inevitably degraded. Various research programs have been carried out on the possibility of combustion of lean air-fuel mixtures and various systems have heretofore been proposed. As one of such proposals, there can be mentioned a torch ignition type engine having a auxiliary combustion chamber, and this engine has proved successful to some extent. However, even if a lean air-fuel mixture having an air-fuel ratio of from 19 to 1 to 20 to 1 is burnt in a good condition by using such a torch ignition type engine, prolongation of the burn-out time cannot be sufficiently moderated and it is impossible to utilize effectively the fuel supplied.

The present invention has been completed as a result of our research conducted with a view to developing a method in which the foregoing defects involved in the conventional techniques can be eliminated and in which the combustion limit of a lean air-fuel mixture is expanded and combustion is effectively accomplished so as to reduce the poisonous components of the base emission without an increase of the fuel consumption and degradation of the drivability.

As is well-known in the art, in an engine of the above-mentioned torch ignition type, a flame turbulence is formed in the main combustion chamber by a flame jet spurted from the auxiliary combustion chamber, whereby reduction of the flame propagation speed inevitably caused in the case of a lean air-fuel mixture is prevented and the combustion limit of a lean air-fuel mixture is expanded. In conventional engines of the torch ignition type, however, improvement of combustion in the auxiliary combustion chamber is insufficient. That is, in the auxiliary combustion chamber, ignition can not be performed in a good condition and, consequently, subsequent combustion can not be developed appropriately.

More specifically, in a conventional engine having an auxiliary combustion chamber, especially one not provided with an intake valve for supplying an air-fuel mixture directly into the auxiliary combustion chamber, since scavenging of the interior of the auxiliary combustion chamber is insufficient, an excessive turbulence is generated by a torch hole at the compression stroke, and since a combustible air-fuel mixture is not present in the vicinity of a spark plug just before ignition, ignition per se cannot be accomplished in a good condition. Further, subsequent combustion in the auxiliary combustion chamber is not developed satisfactorily. The influence of insufficient scavenging in the auxiliary combustion chamber is especially conspicuous at the time of idling. An excessive turbulence formed from the injection hole at the compression stroke causes rapid mixing of a fresh gas and a residual gas and the fresh gas is diluted with the residual gas, resulting in ignition failure. In order to avoid this disadvantage, the spark plug is often disposed in the vicinity of the torch hole. However, if the spark plug is disposed in a torch hole zone, at a high-load and high-speed operation, generation of spark arcs is inhibited by an excessive flow rate in the torch hole zone, and a defect of ignition failure is brought about. In the present invention, in order to overcome this defect, one of the torch holes is disposed in the vicinity of an intake valve so that the auxiliary combustion chamber is scavenged sufficiently by means of the flesh mixture flow at the intake stroke and the residual gas in the auxiliary combustion chamber is relatively reduced. It is true that ignition failure can be avoid in the above mentioned manner, however, because of an excessive turbulence generated in the auxiliary combustion chamber through the torch hole at the compression stroke, the combustion rate in the auxiliary combustion chamber is enhanced and combustion in the auxiliary combustion chamber is completed, while combustion in the main combustion chamber is still at the initial stage. Accordingly, a high torch effect is manifested only at the initial stage of the combustion in the main combustion chamber and a necessary torch effect cannot be expected at the terminal stage of the combustion in the main combustion chamber. In view of the foregoing, it will readily be understood that in order to maintain the torch effect, it is necessary to control the influence of the turbulence formed in the auxiliary combustion chamber at the compression stroke and adjust the combustion rate in the auxiliary combustion chamber appropriately. In conventional engines of the torch ignition type, however, the turbulence in the auxiliary combustion chamber is often excessive, but no intentional methods are taken for controlling such excessive turbulence. Accordingly, at the compression stroke, a large compression turbulence is formed in the auxiliary combustion chamber when an air-fuel mixture is flown into the auxiliary combustion chamber through the torch hole, and hence, the rate of combustion per unit time in the auxiliary chamber is drastically increased and the above defect cannot be eliminated.

In the present invention, the auxiliary combustion chamber is arranged to have a shape of a drum, so that a strong swirl is formed in the auxiliary combustion chamber at the compression stroke. More specifically, the direction of the torch hole is made tangential to the circumferential wall of the drum, whereby generation of a swirl is assured. Further, the ratio of the length of the torch hole to the diameter thereof is adjusted to at least 2, whereby the flow-in direction of the air-fuel mixture is maintained assuredly and a powerful swirl is formed. It is possible to control the intensity of the swirl by changing the distance from the center of the auxiliary combustion chamber with respect to the direction of the spurt hole. It has been found that if a swirl is formed in the auxiliary combustion chamber through the torch hole at the compression stroke, the rate of combustion per unit time in the auxiliary combustion chamber can be adjusted to a suitable value by the centrifugal force of this swirl. More specifically, if the swirling speed is increased, the combustion rate is reduced and the flame propagation speed can also be reduced. This swirling speed can be controlled by changing the size and direction of the torch hole disposed in the drum-shaped auxiliary combustion chamber. However, if the swirling speed is too high, ignition by the spark plug is often insufficient. This disadvantage, however, can be avoided by disposing the spark plug in an area on which the swirl has no influence or by forming a projection in the vicinity of the spark plug. In addition, the following advantage is attained by forming an appropriate swirl in the auxiliary combustion chamber.

That is, the residual gas (formed at the combustion stroke of the preceding cycle) gathers in the vicinity of the center of the auxiliary combustion chamber and a rich air-fuel mixture is stratified in the peripheral portion of the auxiliary combustion chamber by the centrifugal force of the swirl. Accordingly, if the spark plug is disposed in the outer portion of the swirl, a relatively rich air-fuel mixture is present in the vicinity of the spark plug and ignitionability is improved. The more important thing herein is that the flame propagation rate to the outer direction of the swirl is decelerated by the centrifugal force while the flame will not go into the center of the swirl because of the shortage of the combustible mixture in the vicinity of the center. Consequently, the total combustion time in the auxiliary combustion chamber is more elongated. This elongation effects is continuously supplying the flame jets to the main combustion chamber for a long time thereby resulting in the quick complete combustion in the main combustion chamber.

In addition, in conventional engines of the torch ignition type, improvement of combustion in the main combustion chamber is insufficient. In general, as the intake air-fuel mixture is diluted, the flame propagation speed is reduced and the burn-out time is prolonged, and finally, the flame is not sufficiently propagated in the entire combustion chamber in a prescribed period of time. As a result, the thermal efficiency is lowered and contents of the components of the base emission, such as HC and CO, are increased. In order to shorten the burn-out time, it is necessary to positively form a turbulence in the combustion chamber or improve the compactness of the combustion chamber. In conventional engines, turbulences formed by a swirls generated at the intake stroke, compression or squish turbulences, combustion turbulences and the like are utilized for shortening the burn-out time, or the compactness is improved by arranging the position of the spark plug or the shape of the combustion chamber.

In "The Journal of Automotive Engineering, June 1975", C. Arama proposes the following formula for the combustion time.

$$d_a = K_1 - K_2[Fc/A + Er]$$

wherein $d_a$ denotes the combustion time, $K_1$ stands for the combustion time in the conventional engine having no auxiliary combustion chamber, $K_2$ designates a coefficient, $Fc/A$ stands for the compactness of the combustion chamber (a factor defining the position of the spark plug and the shape of the combustion chamber for shortening the combustion flame propagation distance), and $Er$ denotes the squish number.

In the engine of the torch ignition type to which the present invention is directed, however, as pointed out hereinbefore, the flame propagation speed in the main combustion chamber is increased by the flame turbulence formed by the flame jet spurted from the auxiliary combustion chamber, to thereby improve combustibility of a lean air-fuel mixture. Namely, in the torch ignition type engine, it is intended to attain the torch effect, and the intensity of this effect is adjusted by the auxiliary combustion chamber volume/total combustion volume ratio and the torch hole area/auxiliary combustion chamber volume ratio. In order to regard this torch effect as an important factor influencing the combustion time, the above formula of C. Arama must be modified as follows:

$$d_a = K_1 - K_2[Fc/A + Er] - K_3Te$$

wherein $Te$ denotes the torch effect and $K_3$ stands for a coefficient.

In the conventional torch ignition type engine, the torch effect is not satisfactory with respect to either the temporal development of combustion or the spatial development of combustion. More specifically, as regards the temporal combustion development, although the flame propagation speed is high at the initial stage of combustion in the main combustion chamber owing to the torch effect, the torch effect is substantially lost at the terminal stage of combustion and no necessary flame turbulence is formed. As regards the spatial combustion development, if the auxiliary combustion chamber is provided with a single torch hole, the flame turbulence is flown in the flame spurting direction of the torch hole and the flame propagation speed in the spurting direction is relatively high, but the flame propagation speed in the direction perpendicular to the spurting direction is relatively low. Accordingly, a sufficient flame propagation speed cannot be obtained throughout the main combustion chamber.

In the present invention, a swirl is formed, as pointed out hereinbefore, in the auxiliary combustion chamber to control combustion in the auxiliary combustion chamber so as to cope with the reduction of the flame propagation speed as regards the temporal combustion development, and a plurality of torch holes or squish zones are formed, as detailed hereinafter, so as to cope with the appropriate development of the flame propagation as regards the spatial combustion development. If the idling condition at which the torch effect is lowest is taken as an example, the torch effect is limited at the initial stage of combustion ranging from the point of the start of combustion to a point corresponding to a crank angle of 10° to 20°, and; if the torch effect is seen from the spatial viewpoint, the effect is limited to the vicinity of the torch hole and the flame propagation speed is drastically reduced in the direction perpendicular to the flame spurting direction.

In the present invention, the auxiliary combustion chamber is provided with two torch holes. The flame spurt direction of one torch hole is pointed substantially toward the center of one of two halves of the main combustion chamber almost at the top dead center and the flame spurt direction of the other torch hole is pointed substantially toward the center of the other half of the main combustion chamber. As a result, a flame turbulence is rapidly formed throughout the main combustion chamber. When an effective flame turbulence is not formed in the vicinity of the wall of the main combustion chamber at a point confronting the spurted flame, or in the rear of the spurted flame, even by the torch effect, a squish zone is formed to enhance formation of a flame turbulence in such areas by the compession turbulence. It is possible to improve the flame propagation speed in the rear of the spurted flame by providing, instead of the squish zone, a third torch hole directed to such areas in the rear of the spurted flame.

An object of the present invention is to provide an internal combustion engine capable of effectively reducing the amount of harmful components in the exhaust gas while maintaining the engine output at a sufficiently high level.

Another object of the present invention is to provide a method for controlling the combustion of said internal combustion engine.

According to the present invention, there is provided an internal combustion engine comprising:
- a cylinder comprising a cylinder block and a cylinder head having an intake value and an exhaust valve;
- a piston reciprocally movable in said cylinder block;
- a main combustion chamber defined by said cylinder head and said piston, said cylinder head having therein a mixture supply port only connected to said main combustion chamber via said intake valve and having a cavity defining an auxiliary combustion chamber, said cavity having a cylindrical circumferential wall and opposite side walls;
- at least two passages formed in said wall and communicating said auxiliary combustion chamber and said main combustion chamber, a first one of said passages opening into said auxiliary combustion chamber in a direction tangential to said cylindrical circumferential wall and opening into said main combustion chamber in the vicinity of said intake valve for effective scavenging in said auxiliary combustion chamber by the mixture introduced into the auxiliary combustion chamber via said first passage and for creating a swirl flowing along said cylindrical circumferential wall in the compression stroke, and;
- a spark plug having an electrode located in said auxiliary combustion chamber.

In addition, according to the present invention, there is provided a method of control of combustion in an internal combustion engine having an auxiliary combustion chamber where a flame generated in the auxiliary combustion chamber is spurted into a main combustion chamber as a burning jet to ignite and burn an air-fuel mixture in the main combustion chamber, said method comprising supplying a homogeneous lean air-fuel mixture having an air-fuel ratio lowr than the stoichiometric air-fuel ratio into the combustion chamber at the intake stroke; supplying a part of said air-fuel mixture into the auxiliary combustion chamber through a first communicating passage to discharge the residual gas formed in the auxiliary combustion chamber at the combustion stroke of the preceding cycle into the main combustion chamber through a second communicating passage and scavenge the auxiliary combustion chamber; forming a suitable swirl at the compression stroke by the air-fuel mixture flow into the auxiliary combustion chamber through said first and second communicating passages to control propagation of a turbulent flame by the centrifugal force of said swirl and, thus, control the combustion rate in the auxiliary combustion chamber, and spurting the burning jet into the main combustion chamber through said first and second communicating passages to ignite and burn the air-fuel mixture in the main combustion chamber at the initial stage, whereby the contents of poisonous components in an exhaust gas are reduced without reduction of the performance of the engine.

The above-mentioned objects of the present invention may be more fully understood from the following description of preferred embodiments of the invention, together with the accompanying drawings.

DESCRIPTION OF PREFERRED EMBODIMENTS

Some calculation instances and working examples will first be described.

Calculation Instances

By experiment it has been confirmed that, if the following factors influencing the torch effect satisfy the requirements indicated, a sufficient torch effect can be attained.

Auxiliary combustion chamber volume/(auxiliary combustion chamber volume + main combustion chamber volume) $= \alpha = 8$ to 12%

Figure 1:
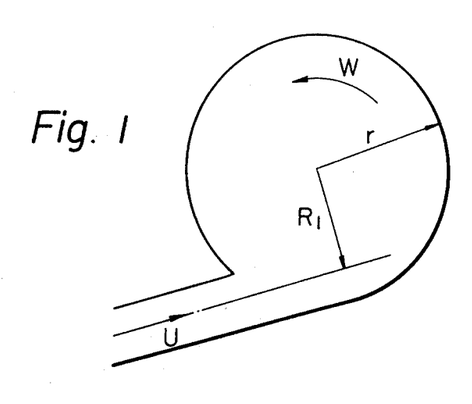
FIG. 1 is a diagram illustrating a pattern of a swirl.

Torch hole area/auxiliary combustion chamber volume $= \beta = 0.03$ to $0.24$ cm$^{-1}$ Since it has been confirmed that the pressure difference between the auxiliary combustion chamber and the main combustion chamber is usually lower than 0.5 kg/cm$^2$, and since such minute difference can be neglected in calculating the flow-in speed U cm/sec of the air-fuel mixture at the torch hole at the compression stroke, the flow-in speed, U cm/sec, at a crank angle of $\theta°$ after the top dead center is expressed as follows.

$$U = \frac{\pi NV}{60 \mu F} \cdot \frac{B(\theta)}{\frac{1}{\epsilon - 1} + A(\theta)} \text{ (cm/s)}.$$

wherein $V$ denotes the volume (cc) of the auxiliary combustion chamber, $N$ stands for the revolutions (rpm) of the engine, $F$ indicates the sectional area (cm$^2$) of the torch hole, $\epsilon$ stands for the compression ratio, $A(\theta)$ is expressed by the formula $\frac{1}{2}(1-\cos\theta+\lambda/2\sin^2\theta)$, $B(\theta)$ is expressed by the formula $(\sin\theta+\theta/2\sin^2\theta)$, $\mu$ is the flow rate coefficient of the torch hole, and $\lambda$ denotes the connecting rod ratio. Supposing that $V$ is 4.7 cc, $\epsilon$ is 8.5 and $\mu$ is 1, during the compression stroke, U has a maximum value when $\theta°$ equals 33° BTDC, and maximum values of U at specific engine revolutions are as shown in Tables 1 and 2 given hereinafter. Supposing that the speed of the swirl at the crank angle of $\theta°$ is W (cm/sec) and the air-fuel mixture flown into the auxiliary combustion chamber is regarded as a rigid body, the following formula of Sitkei is established as described in "Kraftstoffaufbereitung und Verbrennung bei Dieselmotoren", published by Springer in 1964.

$$W = \frac{R_1 NV_r}{2 \times 60\mu F R_2^2} \left( \frac{1}{\epsilon - 1} + A(\theta) \right) \cdot$$

$$\int_0^\theta \frac{[B(\theta)]^2}{\left( \frac{1}{\epsilon - 1} + A(\theta) \right)^2} d\theta$$

wherein $R_1$ stands for the distance (cm) from the center of the auxiliary combustion chamber with respect to the direction of the torch hole, $R_2$ stands for the inertia radius (cm) of the volume of the auxiliary combustion chamber, and $r$ stands for the radius (cm) of the auxiliary combustion chamber, as shown in FIG. 1. In the case of the drum-shaped auxiliary combustion chamber, since $R_1$ is nearly equal to $r$ and $R_2$ is 0.707$r$, the maximum value of W during the compression stroke is obtained when $\theta$ is equal to 15° BTDC. Maximum values of W at specific engine revolutions are as shown in the following Tables 1 and 2.

Table 1

In the case of $\alpha = 10\%$ and $\beta = 0.04$

| Engine revolutions (rpm) | U (m/s) | W (m/s) |
|---|---|---|
| 1000 | 38 | 41 |
| 3000 | 113 | 122 |
| 6000 | 225 | 245 |

Table 2

In the case of $\alpha = 10\%$ and $\beta = 0.15$

| Engine revolutions (rpm) | U (m/s) | W (m/s) |
|---|---|---|
| 1000 | 10 | 8 |
| 3000 | 30 | 23 |
| 6000 | 60 | 45 |

The turbulence on the flame face formed in the auxiliary combustion chamber is most influenced by the flow-in speed of the air-fuel mixture introduced through the torch hole at the compression stroke. As pointed out hereinbefore, if a swirl is formed in the auxiliary combustion chamber, the turbulence may be adjusted by the speed of the swirl. Namely, propagation of the turbulent flame is greatly influenced by the centrifugal force of the swirl. In the case where the flame face is propagated against the centrifugal force of the swirl, the propagation speed is increased, but when the flame face is propagated in the direction of the centrifugal force, the propagation speed is reduced. More specifically, in the case where the flame face is advanced in the direction of the centrifugal force, increase of the propagation speed caused by the compression turbulence generated from the torch hole at the compression stroke is reduced by buoyancy caused by the centrifugal force of the swirl. Accordingly, as the speed of the swirl is increased, the influence of the compression turbulence on the peripheral portion of the swirl is gradually reduced and the flame propagation speed in this area is reduced. Thus, the combustion rate throughout the interior of the auxiliary combustion chamber is reduced and finally, the compression turbulence comes to have no influence on the combustion rate. This critical condition is expressed by the following formula.

$$(W'/U')^2 = r/l$$

wherein $l$ denotes the turbulence scale (cm), $U'$ denotes the turbulence intensity (cm/s), $W'$ designates the critical swirl speed (cm/s) and $r$ stands for the swirl radius (cm).

Supposing that $r/l$ is 10 and $U'$ is 1400 cm/s, $W'$ is 4200 cm/s (=42 m/s). Accordingly, under conditions indicated in Table 1, the influence of the turbulence generated in the auxiliary combustion chamber is negated by the swirl over the entire range of the engine revolutions (rpm). In contrast, under conditions shown in Table 2, the influence of the compression turbulence is present if the number of revolutions is not higher than 3000 rpm.

As will be apparent from the foregoing calculation instances, the influence of the compression turbulence generated in the auxiliary combustion chamber by the torch hole can be adjusted by changing the speed of the swirl, and the flame propagation speed in the auxiliary combustion chamber and, in turn, the combustion rate in the auxiliary combustion chamber can be adjusted to desired values.

The present invention will now be described in detail by reference to embodiments illustrated in the accompanying drawings.

Figure 2:
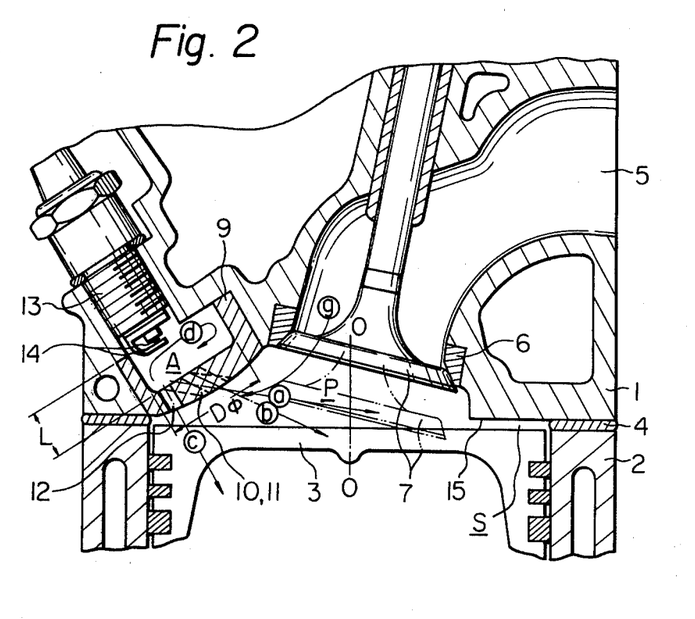
FIG. 2 is a sectional view of a counter-flow type engine, which illustrates a first embodiment of the present invention.
Figure 3:
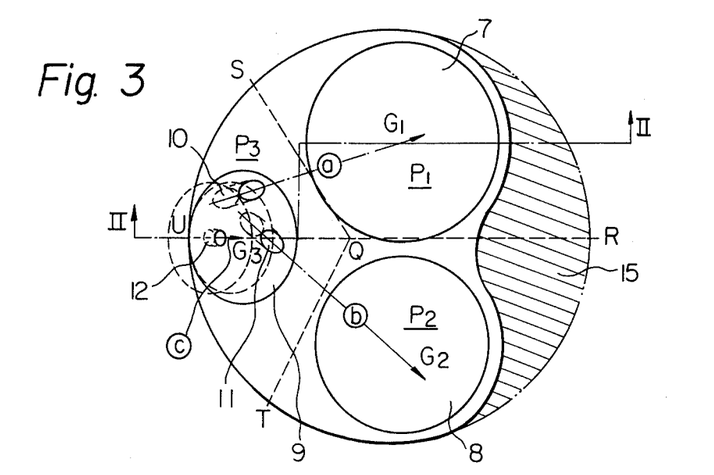
FIG. 3 is a view of the inner face of the cylinder head of the engine of the first embodiment, seen from below.

FIGS. 2 and 3 illustrate the structure of a first embodiment where the present invention is applied to a counter-flow engine. FIG. 3 is a plan view of a cylinder head seen from below, and FIG. 2 is a view illustrating the section taken along the line II—II in FIG. 3. Referring to FIGS. 2 and 3, a cylinder head 1 is connected to a cylinder block 2 through a cylinder head gasket 4, and a main combustion chamber P is formed and defined by the cylinder head 1 and the top face of a piston 3 slidably inserted into the cylinder. A homogeneous lean air-fuel mixture is supplied into the main combustion chamber P from an intake port 5 as an air-fuel mixture supply passage. The intake port 5 is disposed substantially in the tangential direction to the cylinder in the plan view so that the air-fuel mixture sucked in the main combustion chamber P forms a swirl.

This air-fuel mixture has an air-fuel ratio suitable for reduction of the poisonous components in the base emission, for example, an air-fuel mixture of 18 to 1 or more than 18 to 1. A valve sheet 6 is fitted on the main combustion chamber side open end of the intake port 5, and an intake valve 7 is seated on this valve seat 6. An auxiliary chamber pot 9 having a shape of a drum is press-fitted into the cylinder head 1 at a position deviated from the central axis 0—0 of the cylinder, and this pot constitutes an auxiliary combustion chamber A.

Communication holes 10 and 11 are formed on the side wall of the auxiliary chamber pot 9 facing the main combustion chamber P, so that each communication hole is extended in the direction tangential to the circumferential wall of the auxiliary chamber pot 9. The main combustion chamber side open end of the communication hole 10 faces the intake port. On the side wall of the auxiliary chamber pot 9, another communication hole 12 is formed so that it extends in the direction perpendicular to the side wall. In this arrangement, at the intake stroke, the intake valve 7 is opened as indicated by a two-dot chain line, and the lean air-fuel mixture is flown in along the back face of the intake valve 7 as indicated by an arrow $g$. A part of this lean air-fuel mixture is flown into the auxiliary combustion chamber A through the communication hole 10 to form a swirl. At this moment, since the piston 3 is in the lowered position, the pressure in the main combustion chamber is reduced and the residual gas of the preceding cycle left in the auxiliary combustion chamber A is discharged into the main combustion chamber P through the communication holes 11 and 12. Thus, the auxiliary combustion chamber A is effectively scavenged. A spark plug 13 is attached to the cylinder head 1 and spark-generating electrode 14 is arranged at a position near the central axis of the auxiliary combustion chamber A remote from the circumferential wall of the auxiliary chamber pot 9.

The auxiliary combustion chamber A is constructed so that the ratio of the length L of both the side walls of the auxiliary chamber A to the diameter D of the circumferential wall of the auxiliary chamber A, namely the ratio L/D, is in the range of from 0.3 to 1. On the cylinder head 1, a crescent-shaped bank 15 is further mounted on the side opposite to the auxiliary chamber pot 9, so that it approaches the top face of the piston 3 at the top dead center. When the piston 3 arrives at the top dead center, this bank 15 and the top face of the piston 3 form a squish zone S to generate a strong turbulence in the main combustion chamber P. The communication holes 10, 11 and 12 are arranged so that the axes $a$, $b$ and $c$ of the communication holes 10, 11 and 12 are directed to the centers $G_1$, $G_2$ and $G_3$ of substantially equal three spaces $P_1$ (QRS), $P_2$ (QRT) and $P_3$ (QST) of the main combustion chamber P, which are formed when the piston 3 is at the top dead center, respectively. If the engine is appropriately designed, provision of the communication hole 12 may be omitted. In this case, the two communication holes 10 and 11 are arranged so that the axes $a$ and $b$ of the holes 10 and 11 are directed to the centers of the two spaces RSU and RTU, respectively. By providing the bank 15 in the main combustion chamber P in the foregoing manner, as regards the spatial flame propagation, the above-mentioned compactness, Fc/A, is improved, and; by arranging the directions $a$, $b$ and $c$ of the communication holes in the foregoing manner, the flame propagation distance can be shortened and the compactness can be further improved. In this structure, as pointed out hereinbefore, at the intake stroke, both the scavenging of the auxiliary combustion chamber A and the suck of the air-fuel mixture can be effectively accomplished simultaneously by virtue of the pressure difference between the side of the main combustion chamber P and the auxiliary combustion chamber A in each of the connection holes, and further, a swirl is formed in the main combustion chamber P. At the compression stroke, the lean air-fuel mixture supplied into the main combustion chamber P is powerfully introduced into the auxiliary combustion chamber A through the communication holes 10, 11 and 12. At this moment, since the communication holes 10 and 11 are disposed toward the direction tangential to the circumferential wall of the drum-shaped auxiliary combustion chamber A, a strong swirl indicated by an arrow d is formed. As pointed out hereinbefore, the intensity of this swirl is appropriately arranged by suitably choosing the relative positions, shapes and dimensions of the communication holes and auxiliary combustion chamber so that the combustion rate in the auxiliary combustion chamber A is appropriately controlled. In this arrangement, if the swirl of the lean air-fuel mixture generated in the auxiliary combustion chamber is ignited by the electrode 14 of the spark plug 13, as illustrated hereinbefore by reference to the calculation instances, the propagation of the turbulent flame directed to the periphery of the swirl is inhibited and the turbulence is controlled so that a desirable development of combustion is attained throughout the interior of the auxiliary combustion chamber A. Even if the residual gas in the auxiliary combustion chamber A formed in the preceding cycle is removed by scavenging at the intake stroke, a part of the combustion gas is sometime left as the residual gas in the auxiliary combustion chamber A. Such residual gas is left in the central portion of the auxiliary combustion chamber A when the above-mentioned swirl is generated in the auxiliary combustion chamber A. More specifically, the residual gas is present in the central portion of the auxiliary combustion chamber A and a freshly supplied lean air-fuel mixture is present around the residual gas in the stratified state. Accordingly, if the core of a flame is generated in the vicinity of the center of the swirl, propagation of the flame directed to the periphery of the swirl is controlled as pointed out hereinbefore, and the overall combustion time in the auxiliary combustion chamber is further prolonged. If the auxiliary combustion chamber is designed so that an appropriate swirl is formed and the amount of the residual gas is appropriately controlled as mentioned above, the combustion time or rate in the auxiliary combustion chamber can be controlled suitably. Namely, it is possible to prevent occurrence of an undesired phenomenon that combustion in the auxiliary combustion chamber is instantaneously completed, and combustion in the auxiliary combustion chamber is maintained for a certain period of time, during which a high-temperature and high-pressure flame generated by this combustion is being spurted into the main combustion chamber P in the form of a torch jet through the communication holes 10, 11 and 12. Thus, the torch effect is remarkably improved. Needless to say, if the residual gas is removed by scavenging and the intensity of the swirl is appropriately chosen, it is also possible to control the combustion time appropriately in the auxiliary combustion chamber.

In the main combustion chamber, at the intake stroke a swirl is formed around the axis of the cylinder by the lean air-fuel mixture fed from the intake port, and at the compression stroke the air-fuel mixture is compressed by the bank 15 of the cylinder head 1 and the top face of the piston 3 in the squish zone S to generate a compression turbulence. Accordingly, once the air-fuel mixture in the main combustion chamber is ignited, combustion proceeds under a very good condition owing to this turbulence. The flame is jetted from the first, second and third communication holes 10, 11 and 12 in the prescribed directions a, b and c, and therefore, ignition and combustion take place simultaneously at various points in the main combustion chamber, and; combustion is developed appropriately either temporally or spatially in the main combustion chamber and is completed in a very short time ranging from the top dead center to a point corresponding to a crank angle of about 45° to about 60°.

In the above-illustrated engine having an auxiliary combustion chamber, to which a lean air-fuel mixture having an air-fuel ratio of about 18 to 1 to about 20 to 1 is supplied, in the auxiliary combustion chamber the swirl is controlled so as to prolong the combustion time appropriately and in the main combustion chamber and direction and number of torch jets are appropriately chosen so as to complete combustion in a short time for preventing reduction of the engine output. Moreover, the shape of the main combustion chamber is partially modified so as to obtain a desirable combination of improvements not attempted in the conventional technique, namely control of combustion in the auxiliary combustion chamber, improvement of the torch effect, improvement of the compactness and enhancement of the squish effect. As a result, according to the present invention, the contents of poisonous components in an exhaust gas, such as CO, HC and $NO_x$, can be simultaneously reduced and the engine output can be maintained at a desirable high level.

Figure 4:
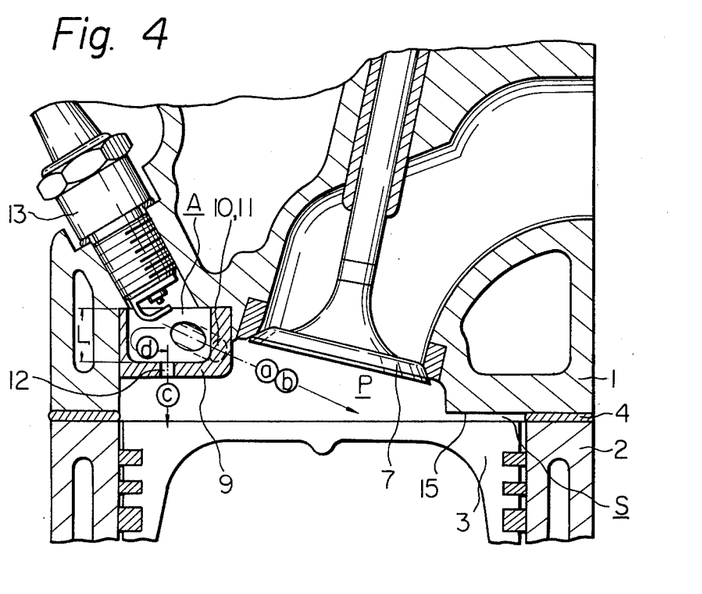
FIG. 4 is a view showing the section taken along the line IV—IV in FIG. 5.
Figure 5:
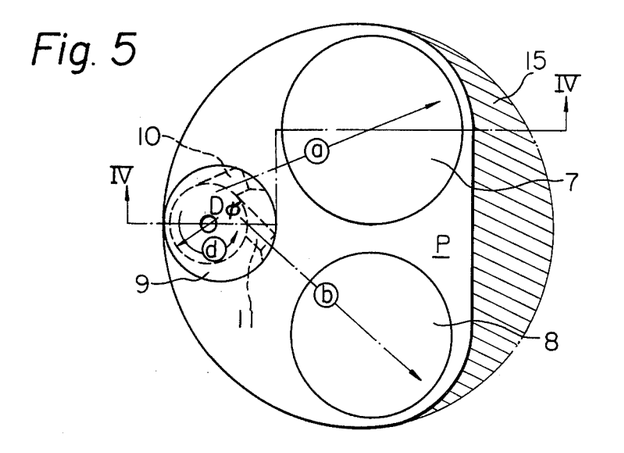
FIG. 5 is a view showing a second embodiment of the present invention.

A second embodiment of the present invention is illustrated in FIGS. 4 and 5. In this example, there is adopted a structure in which a part of the circumferential wall of the auxiliary chamber pot 9 is exposed to the main combustion chamber P, and the first and second communication holes 10 and 11 are formed at this exposed part of the circumferential wall. In this embodiment, since the direction of the communication holes is more in agreement with the direction of the swirl in the main combustion chamber, the intensity of the swirl in the auxiliary combustion chamber A is more enhanced. Accordingly, it is easier to control combustion in the subsidiary combustion chamber.

Figure 6:
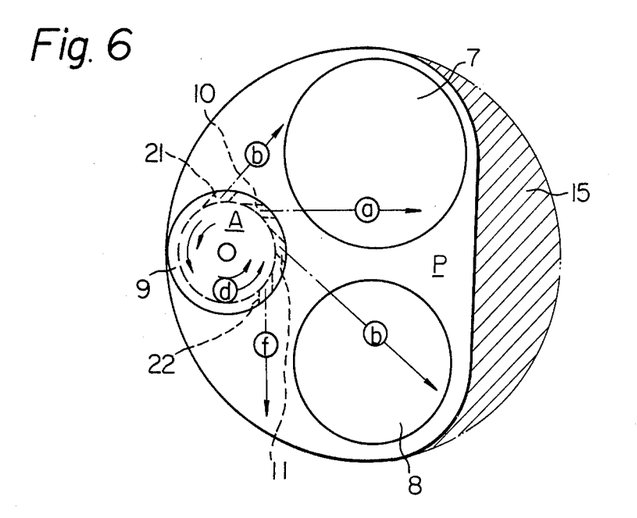
FIG. 6 is a view showing a third embodiment of the present invention.

FIG. 6 illustrates a third embodiment of the present invention which is an improvement of the example illustrated in FIGS. 4 and 5. In this example, five communication holes are formed and first, second, fourth and fifth communication holes 10, 11, 21 and 22, respectively are disposed in a direction tangential to the circumferential wall of the auxiliary chamber pot 9. These five communication holes are arranged so that they are directed to the centers of five equally divided spaces of the main combustion chamber P, respectively. In this structure, the intensity of the swirl in the auxiliary combustion chamber A can be further enhanced and the compactness Fc/A of the main combustion chamber can be further improved, whereby complete combustion in the engine can be controlled.

Figure 7:
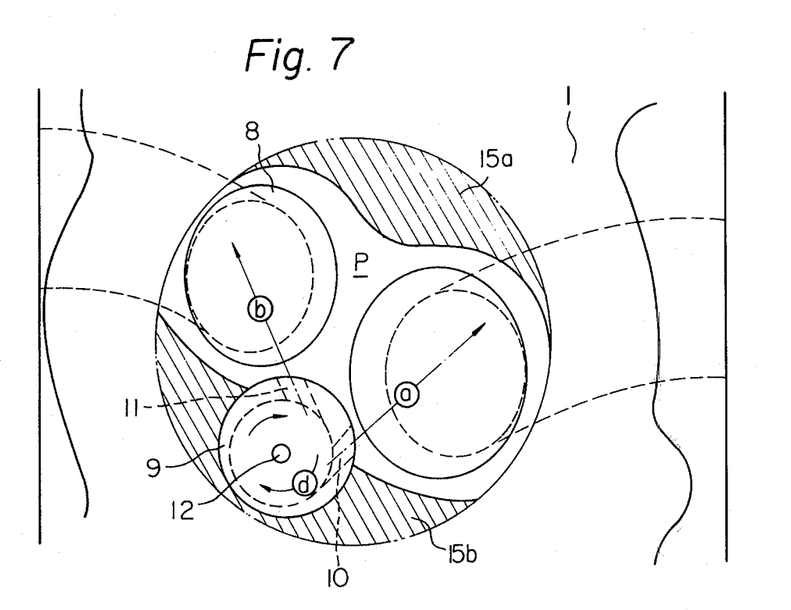
FIG. 7 is a view showing a fourth embodiment of the present invention.

FIG. 7 is a view showing a fourth embodiment, in which the present invention is applied to a cross-flow type engine. In this embodiment, in order to improve the compactness of the main combustion chamber and the turbulence effect in the main combustion chamber, two squish zones are formed between the cylinder head and the top face of the piston. More specifically, banks 15a and 15b are formed on the cylinder head on the side opposite to the auxiliary combustion chamber A and the side facing the auxiliary combustion chamber A, respectively, so as to envelop the intake valve and exhaust valve between them as shown in FIG. 7.

Figure 8:
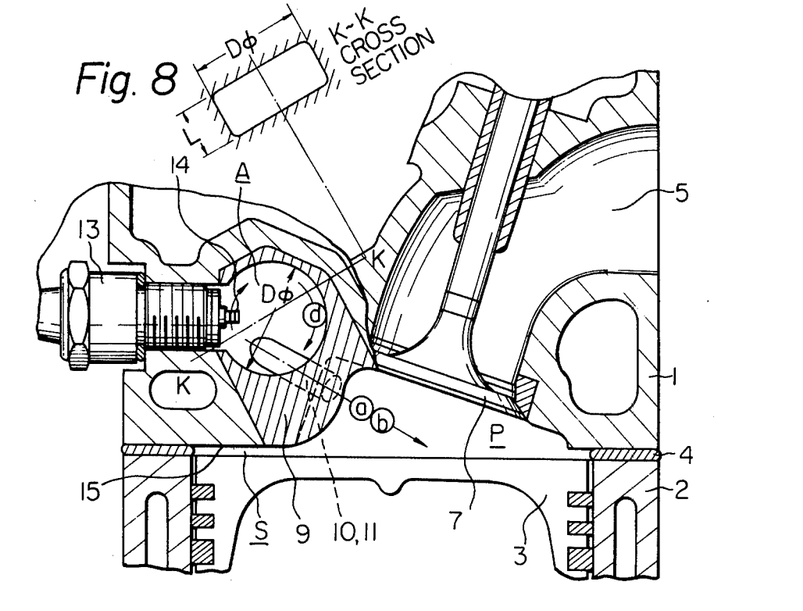
FIG. 8 is a view showing the section taken along the line VIII—VIII in FIG. 9.
Figure 9:
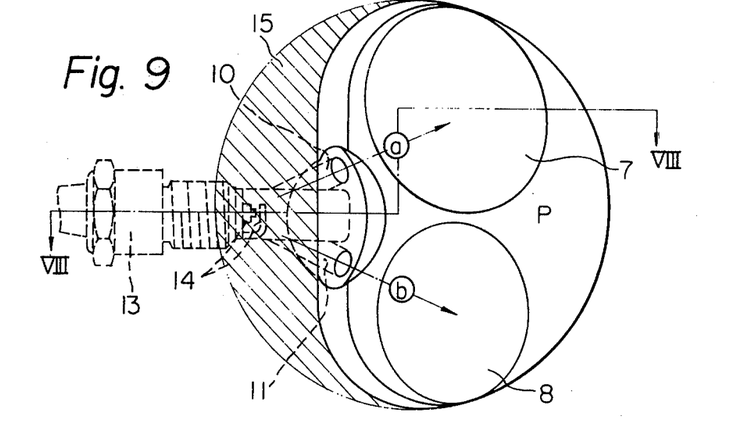
FIG. 9 is a view showing a fifth embodiment of the present invention.

FIGS. 8 and 9 illustrate a fifth embodiment in which the present invention is applied to a counter-flow type engine. In this embodiment a drum-shaped auxiliary combustion chamber is disposed so that its axis is perpendicular to the axis of the cylinder, and a spark plug 13 is attached to the circumferential wall of the auxiliary chamber pot 9. Also in this embodiment, the main chamber side open end of the first communication hole 10 faces the intake port 5, and the first and second communication holes 10 and 11 are arranged so that the axes a and b of these communication holes 10 and 11 are directed to the centers of two equally divided spaces of the main combustion chamber P, respectively. The squish zone is formed on the side facing the auxiliary combustion chamber. Also in this embodiment, at the intake stroke, since the first communication hole 10 is disposed so as to face the intake port 5, an air-fuel mixture is positively supplied into the auxiliary combustion chamber A from the communication hole 10 and the residual gas left in the auxiliary combustion chamber is discharged into the main combustion chamber through the communication hole 11 owing to the pressure difference between the main combustion chamber and the auxiliary combustion chamber. At the compression stroke, a powerful swirl indicated by an arrow d is formed in the auxiliary combustion chamber A. The swirling air-fuel mixture is ignited by the spark plug 13 and, as in the preceding examples, propagation of the flame directed toward the periphery of the swirl is inhibited and combustion in the auxiliary combustion chamber is controlled appropriately.

Figure 10:
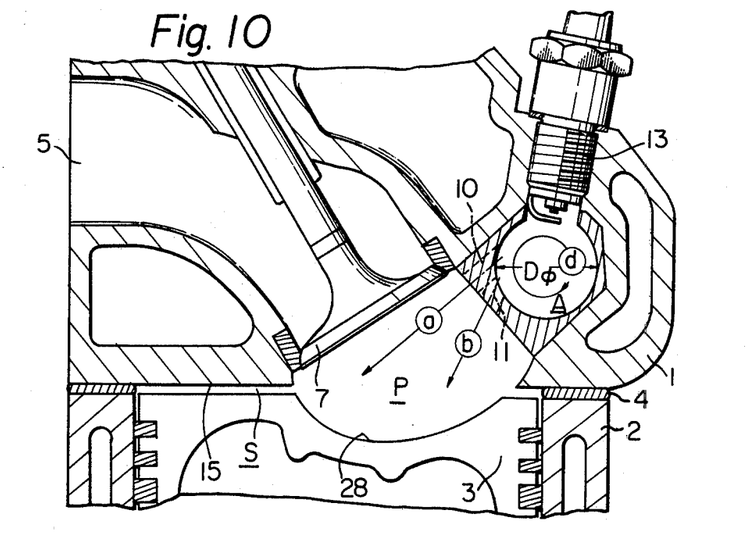
FIG. 10 is a view showing the section taken along the line X—X in FIG. 11.
Figure 11:
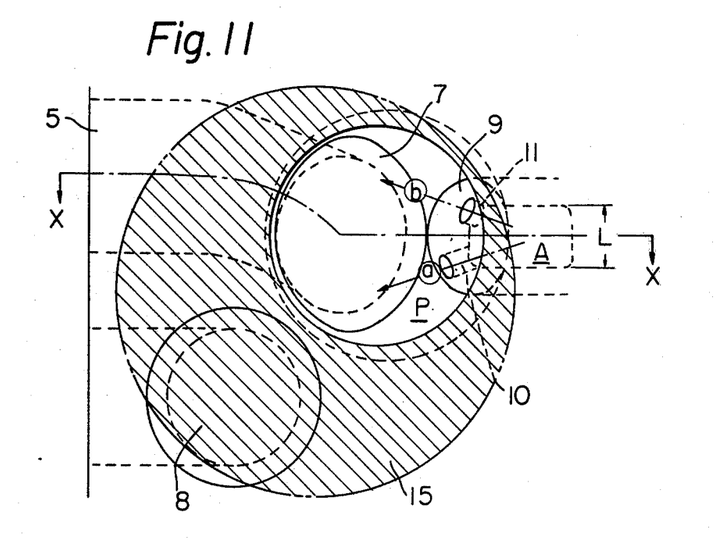
FIG. 11 is a view showing a sixth embodiment of the present invention.

In an embodiment illustrated in FIGS. 10 and 11, in order to further improve the compactness, the squish zone S is enlarged, the bank 15 is formed on the cylinder head 1 to envelop the intake valve therein, and a cavity 28 is formed on the top face of the piston 3. Also in this embodiment, the communication holes 10 and 11 are arranged so that the axes a and b of the communication holes 10 and 11 are directed to the centers of two equal halved spaces of the main combustion chamber P, respectively, when the piston 3 is at the top dead center.

Figure 12:
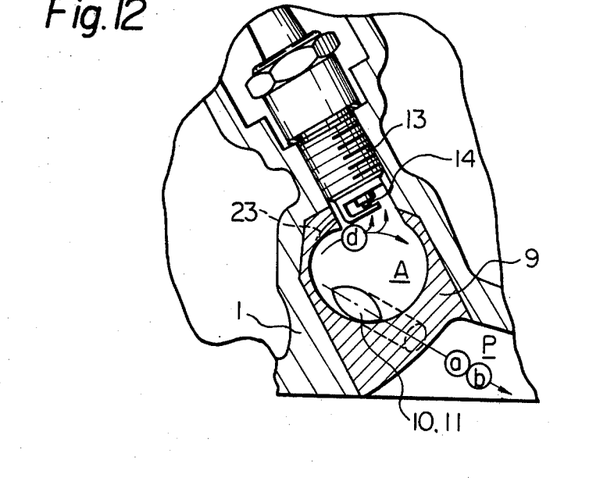
FIG. 12 is a view showing a seventh embodiment of the present invention, particularly the shape of the auxiliary combustion chamber.

FIG. 12 illustrates an embodiment in which the electrode 14 of the spark plug 13 is located in an area where the powerful swirl has no influence, so that blow-out of sparks at the time of ignition is prevented. More specifically, a projection 23 is formed in the auxiliary combustion chamber A so that the swirl is prevented from having direct contact with the electrode 14 of the spark plug 13.

Figure 13:
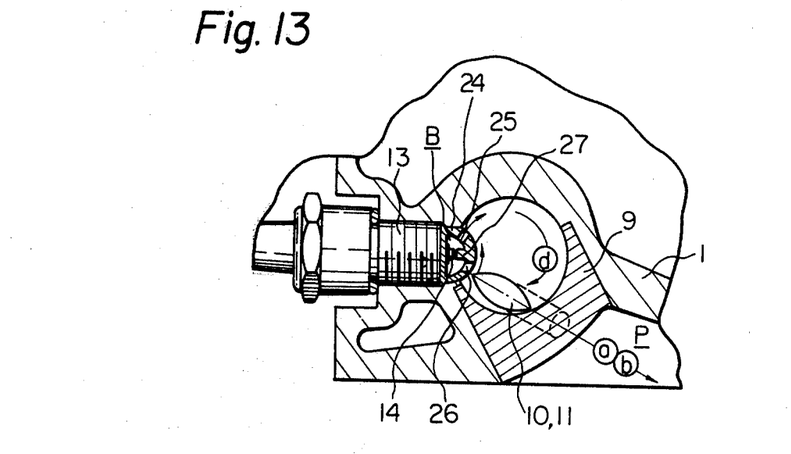
FIG. 13 is a view showing an eighth embodiment of the present invention, particularly the shape of the auxiliary combustion chamber.

FIG. 13 illustrates still another embodiment in which ignition is very much facilitated. The electrode 14 of the spark plug 13 is covered with a partition wall 24, formed integrally with the auxiliary chamber pot 9, so that the swirl has no direct contact with the electrode 14. In this embodiment, the positive terminal of the spark plug 13 is disposed on the plug 13, but a portion 27 projected inside the partition wall 24 is used as the negative electrode. Of course, the negative electrode may be disposed on the spark plug 13 as in the preceding examples. Small injection holes 25 and 26 are formed on the partition wall 24, and the air-fuel mixture fed into the auxiliary combustion chamber A is also supplied into a chamber B, in which the electrode 14 is installed, through these small injection holes. As in the preceding examples, a powerful swirl is formed in the auxiliary combustion chamber A, but since the surrounding of the electrode 14 is not exposed directly to the swirl, ignition can be accomplished assuredly. A flame formed in the chamber B ignites the air-fuel mixture swirling in the auxiliary combustion chamber A. Combustion in the auxiliary combustion chamber A and the main combustion chamber P is carried out in the same manner as described in the preceding examples. The number of the small injection holes is not limited to two (25 and 26), but one to five small injection holes may be disposed.

As will be apparent from the foregoing illustration, according to the present invention, it is unnecessary to feed an air-fuel mixture in a stratified state, and a homogeneous lean air-fuel mixture may be supplied into both the main combustion chamber and the auxiliary combustion chamber and, simultaneously, the auxiliary combustion chamber can be scavenged. At the compression stroke, by forming an appropriate swirl, the combustion rate in the auxiliary combustion chamber is controlled and combustion in the main combustion chamber can be performed appropriately, whereby the engine output can be maintained at a sufficiently high level and the contents of poisonous components contained in an exhaust gas can be drastically reduced.

What is claimed is:

1. A method of control of combustion in an internal combustion engine having an auxiliary combustion chamber and a main combustion chamber defined by a cylinder, a piston and a cylinder head, where a flame generated in the auxiliary combustion chamber is spurted into the main combustion chamber as a torch jet to ignite and burn an air-fuel mixture in the main combustion chamber, said method comprising:

supplying a homogeneous lean air-fuel mixture having an air-fuel ratio lower than the stoichiometric air-fuel ratio into the main combustion chamber at the intake stroke;

supplying at the intake stroke a part of said air-fuel mixture into the auxiliary combustion chamber through a first passage to discharge the residual gas formed in the auxiliary combustion chamber at the combustion stroke of the preceding cycle into the main combustion chamber through a second passage to thereby scavenge the auxiliary combustion chamber;

forming a suitable swirl in the auxiliary combustion chamber at the compression stroke by the air-fuel mixture flowing into the auxiliary combustion chamber through said first and second passages;

igniting the air-fuel mixture flowing in a swirl, the propagation of a flame in the radial direction of the swirl being controlled by the centrifugal force of the swirl thereby controlling the combustion rate in the auxiliary combustion chamber, and;

spurting a torch jet into the main combustion chamber through said first and second passages to ignite and burn the air-fuel mixture in the main combustion chamber at the initial stage, whereby the contents of poisonous components in an exhaust gas are reduced without reduction of the performance of the engine.

2. A method of control of combustion claimed in claim 1, wherein a swirl is formed in the auxiliary combustion chamber by the air-fuel mixture supplied into the auxiliary combustion chamber at the intake stroke.

3. A method of control of combustion claimed in claim 1, wherein combustion in the main combustion chamber is completed before the crank angle is up to about 45° to about 60° after the top dead center.

4. A method of control of combustion claimed in claim 1, wherein a swirl turning around the axis of the cylinder is formed by the air-fuel mixture supplied in the main combustion chamber at the intake stroke.

5. A method of control of combustion claimed in claim 1, wherein a turbulence is formed in the main combustion chamber approximately on termination of the compression stroke by the squishing action.

6. A method of control of combustion claimed in claim 1, wherein a part of burnt gases formed at the preceding combustion stroke is left in the vicinity of the center of the auxiliary combustion chamber.

7. A method of control of combustion claimed in claim 1, wherein the mixture igniting process in the auxiliary combustion chamber is initiated inside the swirl.

8. An internal combustion engine comprising:
a cylinder;
a cylinder head disposed on the cylinder;
a piston reciprocally movable in the cylinder;
the cylinder, the cylinder head and the piston in cooperation defining a main combustion chamber, said cylinder head having an intake port through which an air-fuel mixture is introduced into the main combustion chamber and an exhaust port through which the burnt gases are exhausted out of the main combustion chamber;
an intake valve operablly disposed in the intake port to control the mixture flow;
an exhaust valve operablly disposed in the exhaust port to control the gases flowing out of the main combustion chamber;
an auxiliary combustion chamber in the cylinder head, the auxiliary combustion chamber having a cylindrical circumferential wall and side walls, the auxiliary combustion chamber having a first and a second passages through which both combustion chambers are communicated, the first passage opening into the auxiliary combustion chamber in a direction tangential to the circumferential wall thereby to create a swirl along the circumferential wall and opening into the main combustion chamber in the vicinity of the intake port so as to effectively introduce at the intake stroke into the auxiliary combustion chamber through the first passage the air-fuel mixture which push the burnt gases through the second passage out of the auxiliary combustion thereby scavenging the auxiliary combustion chamber by the introduced mixture; and an ignition spark plug having electrodes located in the auxiliary combustion chamber.

9. An internal combustion engine claimed in claim 8, wherein the auxiliary combustion chamber is arranged to have a drum shape and the swirl is formed along the circumferential wall of the drum-shaped auxiliary combustion chamber.

10. An internal combustion engine claimed in claim 9, wherein the first and second passages are opened to each side walls of the auxiliary combustion chamber, respectively.

11. An internal combustion engine claimed in claim 10, wherein the second passage is disposed in the direction tangential to the circumferential wall of the auxiliary combustion chamber.

12. An internal combustion engine claimed in claim 9, wherein the second passage is disposed in a direction tangential to the circumferential wall of the auxiliary combustion chamber.

13. An internal combustion engine claimed in claim 12, wherein the first and second passages are arranged so that when the main combustion chamber is divided into two substantially equal spaces including open ends of the first and second communicating passages, respectively, said first and second passages are directed substantially to the centers of said spaces, respectively.

14. An internal combustion engine claimed in claim 12, wherein the first and second passages are opened to the same side wall of the auxiliary combustion chamber.

15. An internal combustion engine claimed in claim 12, wherein the first and second passages are opened to the circumferential wall of the auxiliary combustion chamber.

16. An internal combustion engine claimed in claim 9, wherein the auxiliary combustion chamber further having a third passage through which said auxiliary combustion chamber communicates with said main combustion chamber and the first, second and third communicating passages are arranged so that when the main combustion chamber is divided into three substantially equal spaces including open ends of the first, second and third passages, respectively, said three passages are directed substantially to the centers of said three spaces, respectively.

17. An internal combustion engine claimed in claim 9, wherein a spark plug electrode is disposed on the side wall of the auxiliary combustion chamber.

18. An internal combustion engine claimed in claim 9, wherein a spark plug electrode is disposed on the circumferential wall of the auxiliary combustion chamber.

19. An internal combustion engine claimed in claim 18, wherein a projection is formed in the vicinity of the spark plug electrode so that the swirl formed in the auxiliary combustion chamber is prevented from having direct contact with the electrode.

20. An internal combustion engine claimed in claim 9, wherein the auxiliary combustion chamber is arranged so that the ratio of the distance between the side walls of the auxiliary combustion chamber to the diameter of the circumferential wall is in the range of from 0.3 to 1.0.

21. An internal combustion engine claimed in claim 8, wherein the mixture intake port is arranged so as to be directed toward a direction substantially tangential to the cylinder so that a swirl turning around the axis of the cylinder is formed in the main combustion chamber by the air-fuel mixture supplied to the main combustion chamber.

22. An internal combustion engine claimed in claim 8, wherein a squish zone is formed between a part of the inner wall of the cylinder head and the top surface of the piston.

23. An internal combustion engine claimed in claim 22, wherein the squish zone is arranged so that, when the intake valve and the exhaust valve are projected on the top face of the piston, the peripheries of the intake valve and exhaust valve are enveloped in the squish zone formed between the inner wall of the cylinder head and the top surface of the piston.

24. An internal combustion engine claimed in claim 22, wherein the auxiliary combustion chamber is eccentrically disposed with respect to the central axis of the cylinder, and a squish zone is formed between a part of the inner wall of the cylinder head and the top surface of the piston along the peripheral edge of the cylinder on the side opposite to the auxiliary combustion chamber with respect to the central axis of the cylinder.

25. An Internal combustion engine claimed in claim 22, wherein the auxiliary combustion chamber is eccentrically disposed with respect to the central axis of the cylinder, and a squish zone is formed between a part of the inner wall of the cylinder head and the top surface of the piston along the peripheral edge of the cylinder on the same side as the auxiliary combustion chamber with respect to the central axis of the cylinder.

26. An internal combustion engine claimed in claim 22, wherein the squish zone is arranged so that when the intake valve is projected on the top face of the piston, the periphery of the intake valve is enveloped in the squish zone formed between the inner wall of the cylinder head and the top surface of the piston.

27. An internal combustion engine claimed in claim 22, wherein a cavity is formed on the top surface of the piston at a position confronting the intake valve.

28. An internal combustion engine claimed in claim 8, wherein the auxiliary combustion chamber is eccentrically disposed with respect to the central axis of the cylinder and the direction of the first and second communicating passages is substantially opposite to the eccentric direction of the auxiliary combustion chamber.

* * * * *